(12) United States Patent
Bhandari et al.

(10) Patent No.: US 12,388,791 B2
(45) Date of Patent: Aug. 12, 2025

(54) PERSISTENT IP ADDRESS ALLOCATION FOR VIRTUAL PRIVATE NETWORK (VPN) CLIENTS

(71) Applicant: Sophos Limited, Abingdon (GB)

(72) Inventors: Nikhil Bhandari, Bangalore (IN); Vamshi Krishna Dommeti, Bangalore (IN); Praneeth Kumar Reddy Earikireddy, YSR District (IN)

(73) Assignee: Sophos Limited (GB)

( * ) Notice: Subject to any disclaimer, the term of this patent is extended or adjusted under 35 U.S.C. 154(b) by 297 days.

(21) Appl. No.: 17/886,014

(22) Filed: Aug. 11, 2022

(65) Prior Publication Data

US 2024/0007440 A1 Jan. 4, 2024

(30) Foreign Application Priority Data

Jun. 29, 2022 (IN) .............................. 202211037387

(51) Int. Cl.
*H04L 9/40* (2022.01)
*H04L 45/42* (2022.01)
*H04L 45/745* (2022.01)

(52) U.S. Cl.
CPC .......... *H04L 63/0272* (2013.01); *H04L 45/42* (2013.01); *H04L 45/745* (2013.01); *H04L 63/0236* (2013.01)

(58) Field of Classification Search
CPC .......................... H04L 63/0272; H04L 45/745
See application file for complete search history.

(56) References Cited

U.S. PATENT DOCUMENTS

| 8,239,948 B1 | 8/2012 | Griffin et al. |
| 10,929,531 B1 | 2/2021 | Kenemer et al. |
| 2004/0073642 A1* | 4/2004 | Iyer ........................ H04W 8/04 455/433 |

(Continued)

FOREIGN PATENT DOCUMENTS

| CN | 101442565 A | * | 5/2009 |
| WO | 2020212442 A1 | | 10/2020 |

OTHER PUBLICATIONS

International Search Report for PCT/GB2023/050474, Jun. 1, 2023, 4 pages.
Written Opinion for PCT/GB2023/050474, Jun. 1, 2023, 8 pages.

*Primary Examiner* — Hieu T Hoang
(74) *Attorney, Agent, or Firm* — Danielson Legal LLC (57) ABSTRACT

Systems and methods for assigning a persistent internet protocol (IP) address to a virtual private network (VPN) client. The method includes receiving, at a first server, a request for access from a first VPN client, the request including access credentials and the first server having a routing table; sending, from the first server, the access credentials to an access server; receiving, from the access server at the first server, a first static IP address to be assigned to the first VPN client, wherein the first static IP address is selected from a plurality of available static IP addresses; assigning the first static IP address to the first VPN client; and adding the first static IP address to a static routing path in the routing table, the static routing path specifying an interface to which traffic associated with the first VPN client is to be routed. The static routing path is configured to be referenced to enable traffic associated with the first VPN client to be directed through the interface.

14 Claims, 5 Drawing Sheets

(56) References Cited

U.S. PATENT DOCUMENTS

| | | | |
|---|---|---|---|
| 2006/0165103 A1* | 7/2006 | Trudeau | H04L 12/2854 |
| | | | 370/428 |
| 2009/0037763 A1* | 2/2009 | Adhya | H04L 63/166 |
| | | | 714/4.12 |
| 2011/0142053 A1* | 6/2011 | Van Der Merwe | G06F 9/5077 |
| | | | 370/395.1 |
| 2017/0374025 A1* | 12/2017 | Pan | H04L 63/164 |
| 2022/0368631 A1* | 11/2022 | Narula | H04L 45/02 |

* cited by examiner

PERSISTENT IP ADDRESS ALLOCATION FOR VIRTUAL PRIVATE NETWORK (VPN) CLIENTS

CROSS-REFERENCE TO RELATED APPLICATIONS

This application claims the benefit of and priority to IN Pat. App. No. 202211037387, filed Jun. 29, 2022, and titled "Persistent IP Address allocation for VPN Clients", the disclosure of which is hereby incorporated by reference in its entirety.

TECHNICAL FIELD

The present application relates generally to systems and methods for managing a virtual private network ("VPN") and, more particularly but not exclusively, to systems and methods for assigning static IP addresses to VPN clients.

BACKGROUND

Secure Sockets Layer Virtual Private Network ("SSL VPN") tunnels are point-to-point tunnels based on the Transport Layer Security ("TLS") protocol. SSL VPN tunnels provide a secure communication channel between two endpoints on one or more VPNs.

These types of tunnels are typically facilitated by a server instance on one end of the connection and one or more clients on the other end of the connection. The server instance also allocates internet protocol (IP) addresses to clients. For example, the server instance may allocate IP addresses to newly-connecting clients from a fixed pool of IP addresses.

To increase the number of tunnels that can be managed, multiple server instances may each manage a subset of IP addresses of the fixed pool. That is, the pool may be split into subsets or slices that each include a range of IP addresses, and each server instance may manage its own subset. Each of these server instances may also handle the traffic coming in from the local area network ("LAN") resources that it protects, as well as traffic going out to the connected clients.

In some instances, multiple server instances may listen on the same port for incoming connections. When a client device makes a connection request, a front end sends the request to a particular server instance. For example, the front end may rely on a load balancer algorithm to direct requests to particular server instances based on, e.g., the number of connections currently handled by each server instance.

However, this approach may involve each VPN server instance managing a specific pool of non-overlapping IP addresses, which does not permit a client to receive the same IP address over different connections involving different server instances. For example, if a client connects to a different server instance after disconnecting and reconnecting, and each instance manages a different address pool and is associated with a different tunnel ("TUN") interface, the client would not receive the same IP address.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for assigning a persistent IP address to a VPN client. A first server may receive a request for access from a first VPN client and receive, from an access server, a first static IP address to be assigned to the first VPN client.

The first server may have a routing table configured to store a static routing path. The static routing path specifies an interface to which traffic associated with the first VPN client is to be routed, and is configured to be referenced to enable traffic associated with the first VPN client to be directed through a particular interface. This allows the first VPN client to use the same IP address across disconnections.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In the context of the present application, a "static IP address" may refer to an IP address that is meant to be assigned the same client over multiple, asynchronous connections. In the context of the present application, a "dynamic IP address" may refer to an IP address that is meant to be assigned to a client for a single connection. After a connection, the dynamic IP address may be assigned to a different client, and the client may receive a different IP address in a different connection.

SSL VPN tunnels provide secure communication channels between endpoints. When a client attempts to connect to a resource on a VPN, a server instance allocates an IP address from a pool of available IP addresses to the client to use for the connection.

A single server instance may be limited in its ability to manage or otherwise allocate a high number of IP addresses. Accordingly, existing techniques for managing VPNs may rely on multiple server instances; each instance managing a carved slice of an IP address pool. However, this may not allow for the assignment of the same IP address to the same VPN client across multiple connections (e.g., connections separated between by a disconnection), for example, when the VPN client connects to different server instances.

Embodiments herein provide novel systems and methods for assigning a persistent IP address to a VPN client. The embodiments herein involve receiving at a first server a request for access from VPN client. The request may be to access some resource on the VPN, for example.

The first server may then transmit access credentials associated with the request to an access server for authentication. If the client is authenticated, the access server may transmit to the first server a static IP address that is to be assigned to the VPN client. For example, the access server may have access to a pool of a plurality of static IP addresses.

The first server may then assign the static IP address to the VPN client, and add the IP address to a routing path in a routing table. The routing path may specify an interface to which traffic associated with the first VPN client is to be routed. The routing path may be referenced for directing traffic associated with the first VPN client to be directed through the interface associated with the first server instance.

Figure 1:
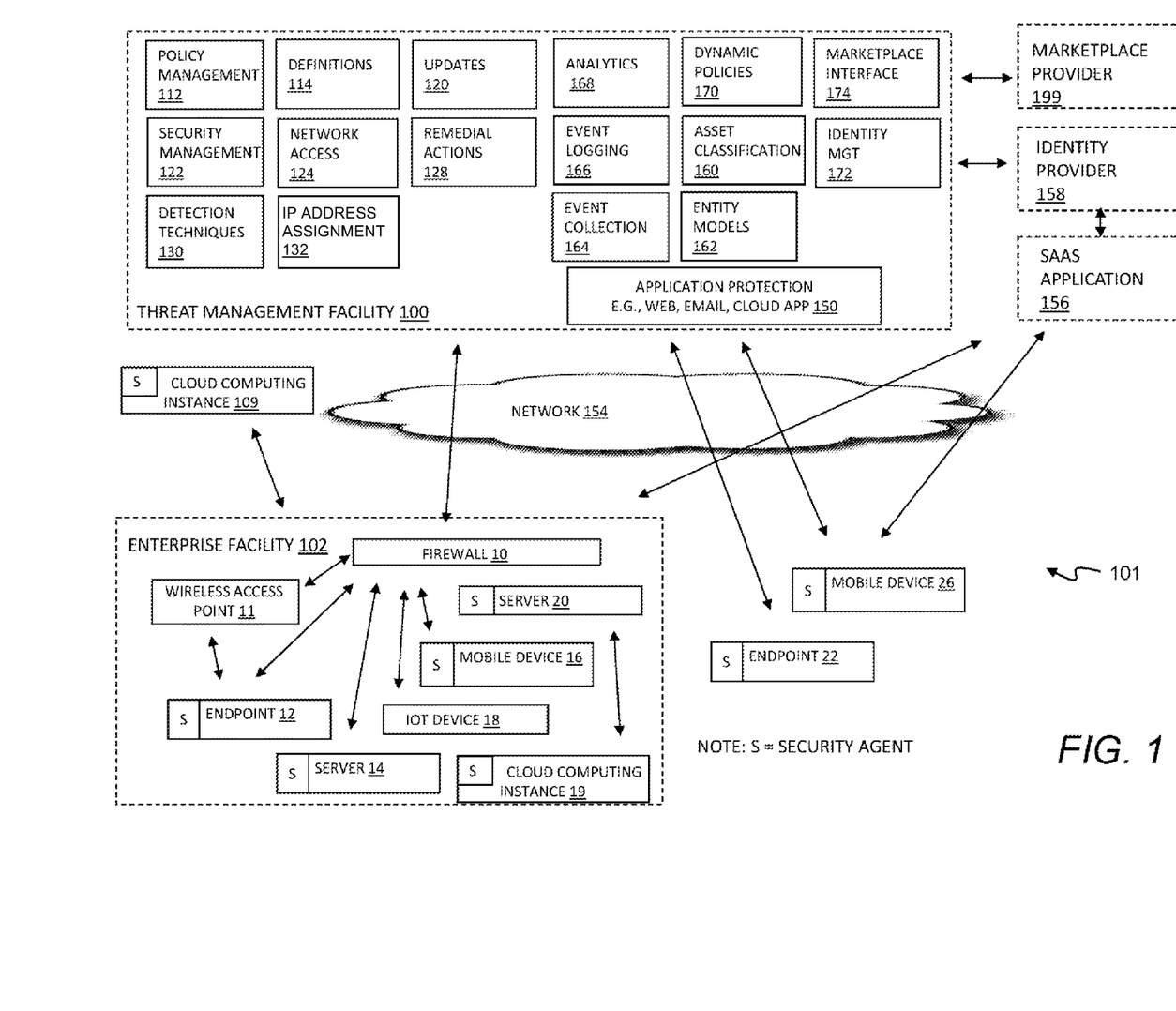
FIG. 1 illustrates a block diagram of a threat management system in accordance with one embodiment.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, an IP address assignment system 132, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
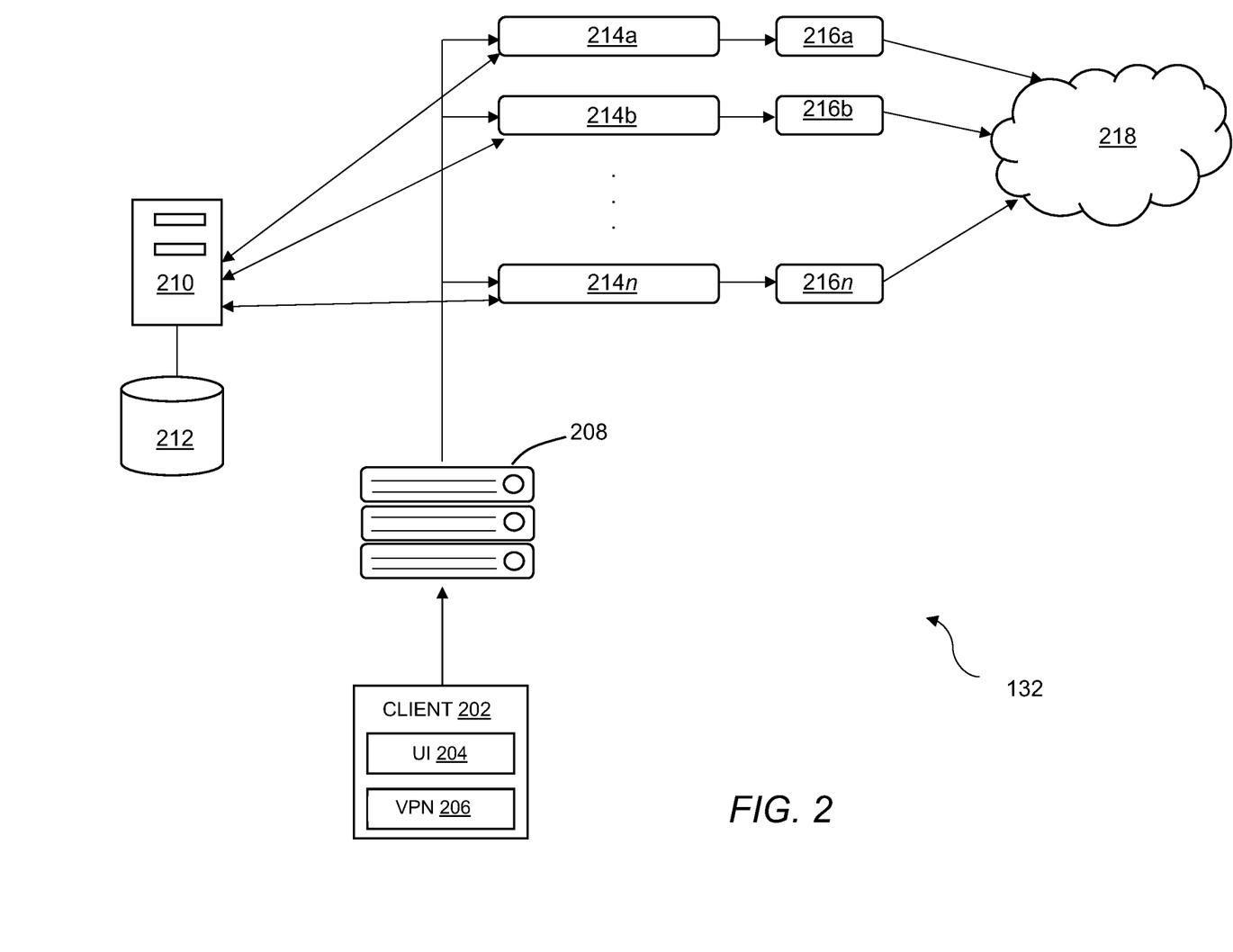
FIG. 2 illustrates an IP address assignment system for allocating IP addresses in accordance with one embodiment.

Components of the threat management facility 100 may also manage how IP addresses are assigned and to which clients. For example, the IP address assignment system 132 may allocate IP addresses to VPN clients. FIG. 2 illustrates the IP address assignment system 132 of FIG. 1 in accordance with one embodiment. As discussed previously, connections over a VPN network generally involve SSL VPN tunnels facilitated by a server instance on one end of the connection and one or more clients on the other end.

In operation, a user may access a client device 202 (for simplicity, "client") to establish a connection over a VPN. The client 202 may be similar to endpoint 12, endpoint 22, or mobile device 26 of FIG. 1, for example. The client 202 may execute or otherwise include a user interface 204 to allow the user to input parameters regarding the desired connection (e.g., the desired VPN resource) and a VPN agent 206.

The VPN agent 206 may issue a request to a load balancer 208 to establish a connection to a first VPN server 214a. In some embodiments, the VPN agent 206 may directly contact one or more VPN servers 214 to establish the connection. The server(s) 214 may include or be similar to the servers 14 or 20 of FIG. 1, for example. Continuing this example, the request from the client 202 may also include credentials that are communicated by the VPN server 214a to an access server 210 as part of an authentication validation step. For example, the client 202 may supply any number of credentials as part of the request to the establish a connection over the VPN. These credentials may include any one or more of a username, password, answer(s) to security question(s), or the like. The access server 210 may be in communication with one or more databases 212 storing data regarding clients.

If the authentication is successful, the access server 210 may check whether a static IP address feature is enabled for the client 202. A static IP address feature may be an administrator-configured parameter that specifies whether or not a client should receive a static IP address. In some embodiments or applications, it may be required or at least desired for a client to receive a static IP address. For example, it may be desirable for a client to have a static IP address for complying with network policies. A particular client may be authorized to perform certain tasks or have certain privileges. By assigning the client 202 a static IP address, the system 132 or devices thereon will recognize that the client 202 associated with a particular static IP address has certain privileges, access rights, or the like. This enables the client 202 to automatically benefit from these privileges or access rights while accessing resources on a network. This may save time and may prevent frustration as users and administrators are not required to grant or otherwise configure an IP address to have certain privileges.

The access server 210 may manage a pool of static IP addresses. If authentication is successful and a static IP feature is enabled, the access server 210 may then transmit a static IP address to the first server 214a for assignment to the client 202. For example, a network of IP addresses may be split into two sub-networks. One of the sub-networks may include IP addresses to be used as dynamic IP addresses, and the other sub-network of IP addresses may include IP addresses to be used as static IP addresses. As an example, the network 10.81.0.0/16 may be split into two networks; addresses in the range of 10.81.0.1 to 10.81.127.254 may constitute the dynamic part of the range, and addresses in the range of 10.81.128.1 to 10.81.255.254 may constitute the static part of the range.

In some embodiments, the access server 210 may traverse a data structure such as a list of static IP addresses in deciding which of the static IP addresses to assign to each server 214a-n. That is, the access server 210 may assign the lowest numerical IP address to server 214a, assign the next lowest numerical IP address to server 214b, and so forth.

In some embodiments, the access server 210 may further divide the pool of static IP addresses into sub-pools. If there are servers on a network that are of a certain type or used for a certain purpose, the access server 210 may associate individual sub-pools with certain types of servers or servers with a particular purpose. In other words, each range of or sub-pool of static IP addresses may be associated with and assigned to a certain type of server.

In some embodiments, the access server 210 may randomly select a static IP address to be assigned to a server 214a-n. As an example, the access server 210 may execute a random-selection or pseudo-random selection algorithm to select a static IP address to be assigned to a server 214a-n.

A network administrator may designate whether a particular client or device should be assigned a static IP address by enabling a static IP feature via a user interface. Or, an administrator may have specifically indicated that a client should receive a dynamic IP address. In some embodiments, a user may have only minimal privileges such that there is no reason to assign the user a static IP address. If the static IP feature is not enabled (i.e., the client should not be assigned a static IP address), the access server 210 sends a null value to the first server 214a.

In this case, first server 214a allocates a dynamic IP address from its pool to the client 202. Each server 214a-n has access to or is otherwise associated with a pool of dynamic IP addresses. For example, dynamic IP addresses in a first range of addresses may be assigned to a first server, dynamic IP addresses in a second range of addresses may be assigned to a second server, etc.

The load balancer 208 may be in communication with or otherwise associated with server instances 214a, 214b, . . . , and 214n where n is the number of server instances configured on the VPN. Each server instance 214a-n is associated with respective one or more TUN interfaces 216a, 216b, . . . , 216n that is used to direct traffic between the client and a network 218 such as the network 154 of FIG. 1. Each server instance 214a-n may store or otherwise have access to a routing table including routing paths. The routing paths specify a TUN interface to which traffic associated with each client is to be routed.

The VPN agent 206 may disconnect from the VPN, either intentionality or by accident. If the VPN agent 206 later attempts to reestablish a connection, the access server 210 may first receive the authentication credentials of the VPN agent 206 from the VPN server 214a. The VPN agent 206 may note that the VPN agent 206 has been configured to receive a static IP address and has previously received a static IP address. The access server 210 may then re-transmit the same static IP address to be re-used with VPN agent 206 for this renewed connection with VPN server 214a.

The embodiments herein may accommodate multiple communication protocols, such as the IPv4 and IPv6 protocols. Additionally, and as discussed above, the lease network of IP addresses may be split into two lower sub-networks. The lower network may be for dynamic IP address allocation and split among the servers 214a-n, and the upper network may be for static IP address allocation and may be managed by the access server 210.

When client 202 initiates a connection request to any of the instances 214a-n of the SSL VPN service, the system 132 may create a dataset of the IP address that is assigned to the client 202 (for simplicity, "IPset"). This IPset may be stored or otherwise configured as part of a routing table, wherein each server or server instance is associated with its own routing table.

The system 132 may then insert a rule to mark or otherwise label traffic associated with a static IP client (i.e., a client with a static IP address) with an instance-specific label. For example, the system may configure this type of rule as part of the mangle table of iptables software.

The system may also add a rule to, when a connection request or traffic is received, look up the instance-specific route table. Each routing table may have only route that routes a packet to the corresponding TUN interface.

Figure 3:
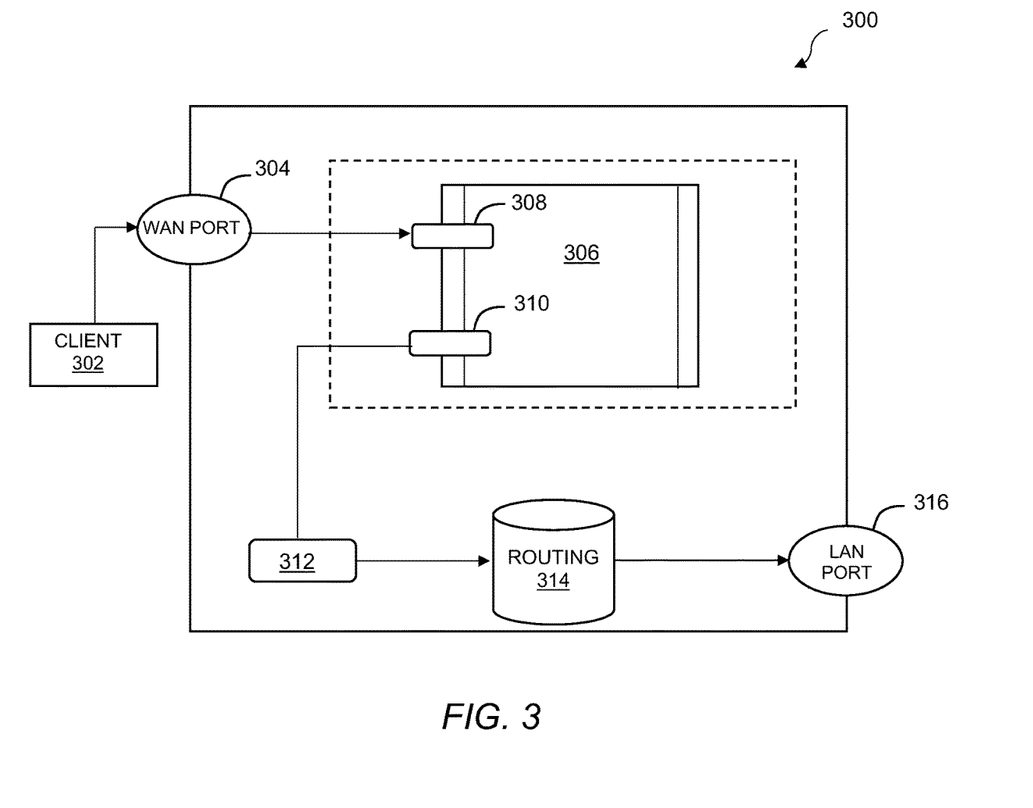
FIG. 3 illustrates a path of a data packet in accordance with one embodiment.

FIG. 3 illustrates a diagram 300 showing the path of a data packet as it travels through a single SSL VPN instance in accordance with one embodiment. In one embodiment, client 302 first connects to a wide area network (WAN) port 304. The client 302 may connect to the server 306 randomly based on a hash of a 5-tuple, for example, or it may be directed there by a load balancer. A 5-tuple in this context may comprise values representing the source IP address, the source port, the destination IP address, the destination port, and the transport protocol. A hash of this 5-tuple represents the 5-tuple in a smaller value. As seen in FIG. 3, traffic arrives at a socket 308, which may be listening on a port such as tcp/8443.

If this is the first connection, the server 306, after receiving the static IP address from the access server (not shown in FIG. 3), may add the assigned IP address to its IPset. The server 306 may reference its routing table and, specifically, add a routing path that specifies the TUN interface to which traffic associated with this client 302 is to be routed.

The server 306 transmits the data via a second socket 310 towards the appropriate TUN interface 312. Traffic from the TUN interface 312 may reference a routing database 314 to determine to which LAN port 316 the traffic should be directed.

Figure 4:
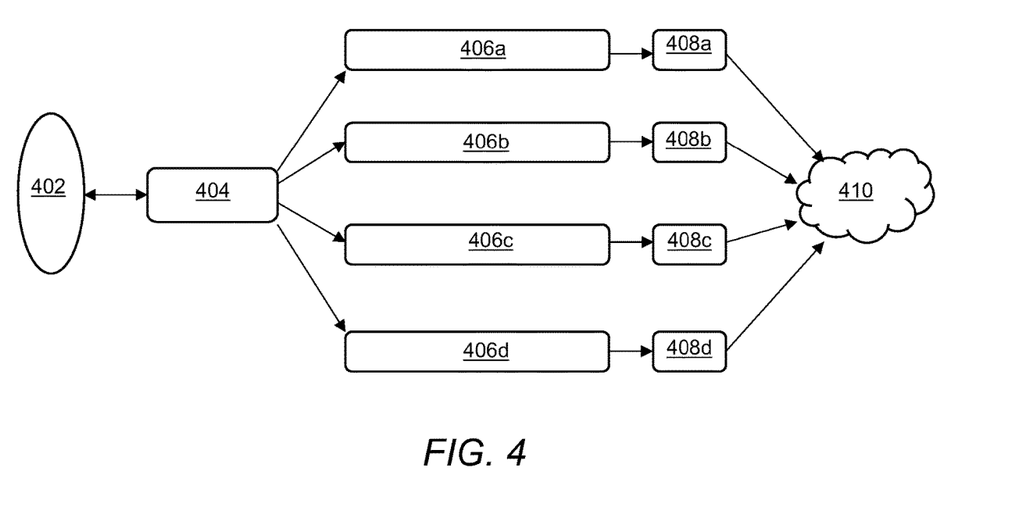
FIG. 4 illustrates a diagram for dynamic pool carving in accordance with one embodiment.

FIG. 4 illustrates a diagram 400 for dynamic pool carving in accordance with one embodiment. Specifically, FIG. 4 illustrates that a small pool of dynamic IP addresses can be allotted to each of a plurality of server instances.

A client 402 may be in communication with kernel load balancer 404 (such as the load balancer 208 of FIG. 2), which acts to send traffic to a specific server instance out of the instances 406a-d. In one embodiment, each instance 406a-d is associated with a TUN interface 408a-d, respectively. The pool of dynamic IP addresses may be divided into sub-pools, and each sub-pool may be assigned to one of the instances 406a-d.

In one example, IP addresses in the range of 10.81.234.0/24 are assigned to instance 406a; in the range of 10.81.234.64/25 to instance 406b; in the range of 10.81.234/128/25 to instance 406c; and in the range of 10.81.234.192/25 to instance 406d. The corresponding TUN interfaces 408a-d may be configured to transmit traffic to and receive traffic from one or more networks 410.

Figure 5:
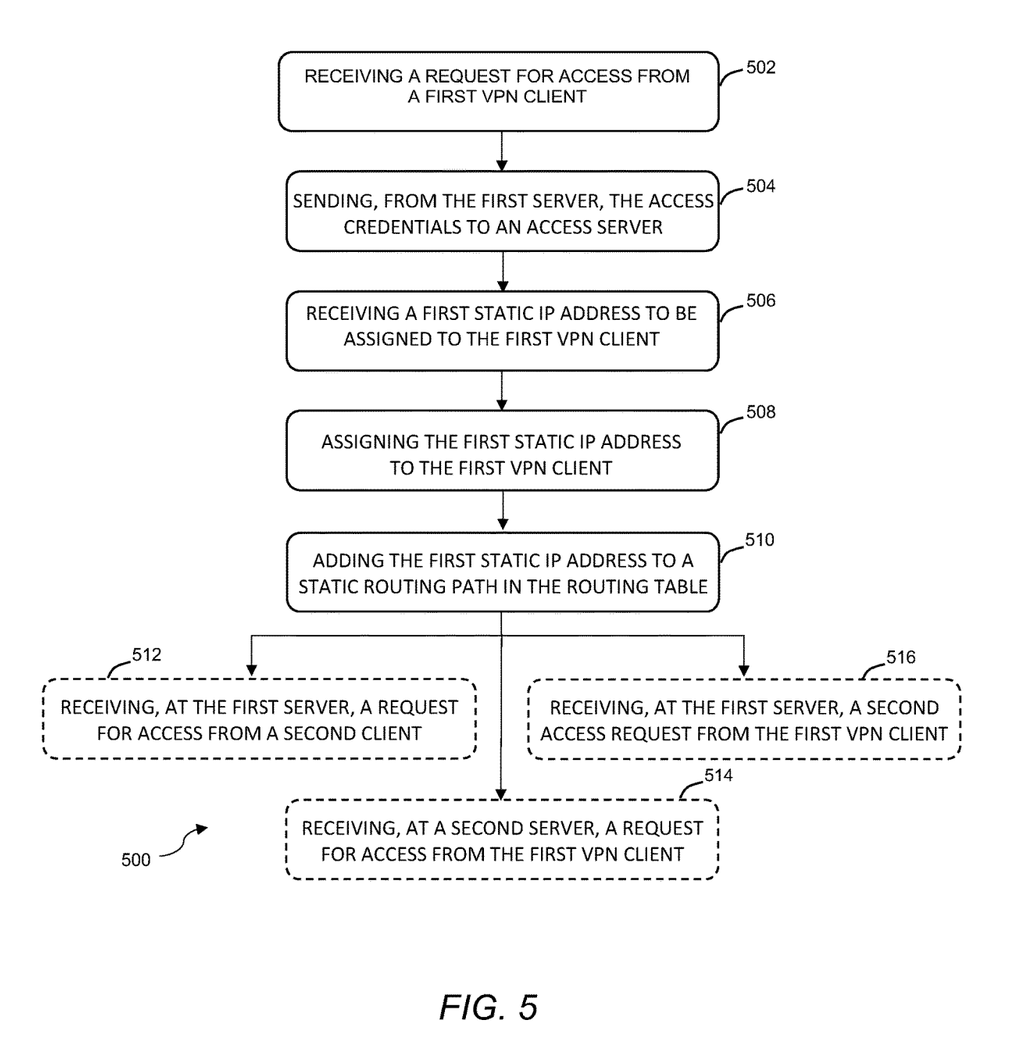
FIG. 5 depicts a flowchart of a method for assigning a persistent IP address in accordance with one embodiment.

FIG. 5 depicts a flowchart of a method 500 for assigning a persistent IP address to a VPN client in accordance with one embodiment. The method 500 may be implemented by one or more of the components illustrated in FIGS. 1-4, and is discussed by way of reference thereto.

In one embodiment, step 502 involves receiving, at a first server (e.g., server 214a of FIG. 2), a request for access from a first VPN client. The request may be from a VPN client such as client 202 of FIG. 2, and may include one or more access credentials provided in conjunction with an authentication validation step.

The first server 214a may also include or otherwise have access to a routing table. The routing table may be configured to store records of clients and an IP address that has been assigned to each of the clients.

Step 504 involves sending, from the first server 214a, the access credentials to an access server 210. The access server 210 may reference one or more databases 212 to verify the credentials are valid.

In some embodiments, method 500 may also include a step of determining whether a static address feature is enabled for the first VPN client 202. That is, an administrator may consider whether the VPN client 202 is authorized to receive or otherwise should be assigned a static IP address. For example, the first VPN client 202 may have certain privileges and should therefore have a static IP address so the user of the VPN client 202 is able to benefit from those privileges across disconnections.

Upon determining that the credentials are valid and that a static address feature is enabled, the access server 210 may provide a first static IP address to the first server 214a. Step 506 therefore involves receiving, from the access server 210 at the first server 214a, a first static IP address to be assigned to the first VPN client 202. As discussed previously, the first static IP address may selected from a plurality of available static IP addresses, which may be configured by an administrator. In one embodiment, the first static IP address is predetermined according to one or more data structures (e.g., a list, a table, or the like). In another embodiment, the first static IP address may be randomly selected according to a random and/or pseudo-random algorithm.

Step 508 involves assigning the first static IP address to the first VPN client 202. If a static IP address feature is not configured for the client (i.e., the first VPN client 202 should not receive a static IP address), the access server 210 may send a null value to the first server 214a. The first server 214a may then allocate an IP address from its dynamic pool network and assign the dynamic IP address to the client 202.

Step 510 involves adding the first static IP address to a static routing path in the routing table. As discussed previously, the routing table may include data regarding how traffic should be routed for this client. Specifically, the static routing path may specify an interface to which traffic associated with the first VPN client 202 is to be routed. In some embodiments, method 500 may further include a step of assigning a first label to traffic associated with the first VPN client 202, wherein the label indicates a rule to reference the static routing path.

Method 500 may also include step 512, which involves receiving, at the first server, a request for access from a second VPN client. Step 512 may further involve determining whether a static feature is enabled for the second VPN client, and assigning a dynamic IP address to the second VPN client upon determining the static feature is not enabled for the second VPN client. The second VPN client may be different than the first VPN client.

In this embodiment, the second VPN client may not be authorized to receive a static IP address. In this case, the first server 214a may have access to or otherwise be assigned a pool of dynamic IP addresses carved from a larger pool of dynamic IP addresses obtained from the access server 210. The first server 214a may assign a dynamic IP address to the second VPN client, who will use the dynamic IP address only for this connection. After the connection is terminated, the second VPN client would receive a different IP address in a subsequent connection. Similarly, the dynamic IP address assigned to the second VPN client becomes available for assignment for other clients.

The first VPN client 202 may subsequently make another request for access after a disconnection. For example, step 514 involves receiving, at a second server (e.g., server 214b), a request for access from the first VPN client 202. The second server 214b or server instance may be different than the first server 214a. As in step 502, the request may include access credentials, which may be sent to the access server 210.

The second server 214b may receive from the access server 210 the first static IP address to be assigned again to the first VPN client 202. The second server 214b may then assign the received first static IP address to the first VPN client 202 for use in this connection. It may also add the first static IP address to a static routing path in the routing table. As discussed previously, the routing table may include data regarding how traffic should be routed for this client. Specifically, the static routing path may specify an interface to which traffic associated with the first VPN client is to be routed. Accordingly, the access server 210 may reference the static routing path to direct traffic associated with the first VPN client through the appropriate interface. Step 512 may further include a step of assigning a first label to traffic associated with the first VPN client, wherein the label indicates a rule to reference the static routing path.

The first VPN client may also make a subsequent access that is again received by the first server. For example, step 516 involves receiving, at the first server, a second access request from the first VPN client. Accommodating this request may involve following steps 504-10 as described previously so that the first static IP address may again be assigned to the first VPN client to satisfy the second request.

In view of the above, the embodiments herein provide technical solutions in the field of IP address management. Specifically, the embodiments herein enable SSL VPN tunnels to be configured with static IP addresses so that a client can receive the same IP address across different connections.

It may be desirable for a VPN client to receive the same IP address across disconnections and new connections for policy-related purposes. There may be instances in which a VPN client may need to or should be granted certain privileges while accessing a VPN. By assigning this client a static IP address, the client can more quickly access the desired VPN resources without requiring further configuration or validation. This inevitably saves time and resources.

In one aspect, embodiments relate to a method for assigning a persistent IP address to a VPN client. The method includes receiving, at a first server, a request for access from a first VPN client, the request including access credentials and the first server having a routing table; sending, from the first server, the access credentials to an access server; receiving, from the access server at the first server, a first static IP address to be assigned to the first VPN client, wherein the first static IP address is selected from a plurality of available static IP addresses; assigning the first static IP address to the first VPN client; and adding the first static IP address to a static routing path in the routing table, the static routing path specifying an interface to which traffic associated with the first VPN client is to be routed, wherein the static routing path is configured to be referenced to enable traffic associated with the first VPN client to be directed through the interface.

In some embodiments, the method further includes assigning a first label to traffic associated with the first VPN client, wherein the first label indicates a rule to reference the static routing path.

In some embodiments, the method further includes determining whether a static address feature is enabled for the first VPN client, and the static IP address is assigned upon determining the static address feature is enabled for the first VPN client.

In some embodiments, the method further includes receiving, at the first server, a request for access from a second VPN client; determining whether a static address feature is enabled for the second VPN client; and assigning a dynamic IP address to the second VPN client upon determining the static address feature is not enabled for the second VPN client. In some embodiments, the first server is assigned a plurality of dynamic IP addresses for assignment to VPN clients.

In some embodiments, the method further includes: receiving, at the first server, a second access request from the first VPN client, and assigning the selected. static IP address to the first VPN client to satisfy the second request. According to another aspect, embodiments relate to a system for assigning a persistent internet protocol (IP) address to a virtual private network (VPN) client. The system includes a first server configured to: receive a request for access from a first VPN client, the request including access credentials and the first server having a routing table, send the access credentials to an access server, receive from the access server a first static IP address to be assigned to the first VPN client, wherein the first static IP address is selected from a plurality of available static IP addresses, assign the first static IP address to the first VPN client, and add the first static IP address to a static routing path in the routing table, the static routing path specifying an interface to which traffic associated with the first VPN client is to be routed, wherein the static routing path is configured to be referenced to enable traffic associated with the first VPN client to be directed through the interface.

In some embodiments, the first server is further configured to assign a first label to traffic associated with the first VPN client, wherein the first label indicates a rule to reference the static routing path.

In some embodiments, the first server is further configured to determine whether a static feature is enabled for the first VPN client, and the static IP address is assigned upon determining the static feature is enabled for the first VPN client.

In some embodiments, the first server is further configured to receive a request for access from a second VPN client, determine whether a static feature is enabled for the second VPN client, and assign a dynamic IP address to the second VPN client upon determining the static feature is not enabled for the second VPN client. In some embodiments, the first server is assigned a plurality of dynamic IP addresses for assignment to VPN clients.

In some embodiments, the system further includes a second server configured to: receive a request for access from the first VPN client, the request including access credentials, send the access credentials to the access server, receive from the access server the first static IP address to be assigned again to the first VPN client, and assign the first static IP address to the first VPN client.

In some embodiments, the first server is further configured to receive a second access request from the first VPN client, and assign the selected static IP address to the first VPN client to satisfy the second request.

According to yet another aspect, embodiments relate to a computer program product for assigning a persistent internet protocol (IP) address to a virtual private network (VPN) client, the computer program product comprising computer executable code embodied in one or more non-transitory computer readable media that, when executing on one or more processors, performs the steps of: receiving, at a first server, a request for access from a first VPN client, the request including access credentials and the first server having a routing table; sending, from the first server, the access credentials to an access server; receiving, from the access server at the first server, a first static IP address to be assigned to the first VPN client, wherein the first static IP address is selected from a plurality of available static IP addresses; assigning the first static IP address to the first VPN client; adding the first static IP address to a static routing path in the routing table, the static routing path specifying an interface to which traffic associated with the first VPN client is to be routed, wherein the static routing path is configured to be referenced to enable traffic associated with the first VPN client to be directed through the interface.

In some embodiments, the computer program product further includes computer executable code that, when executing on one or more processors, performs the step of assigning a first label to traffic associated with the first VPN client, wherein the first label indicates a rule to reference the static routing path.

In some embodiments, the computer program product further includes computer executable code that, when executing on one or more processors, performs the step of determining whether a static feature is enabled for the first VPN client, and the static IP address is assigned upon determining the static feature is enabled for the first VPN client.

In some embodiments, the computer program product further includes computer executable code that, when executing on one or more processors, performs the steps of: receiving, at the first server, a request for access from a second VPN client, determining whether a static feature is enabled for the second VPN client, and assigning a dynamic IP address to the second VPN client upon determining the static feature is not enabled for the second VPN client. In some embodiments, the first server is assigned a plurality of dynamic IP addresses for assignment to VPN clients.

In some embodiments, the computer program product further includes computer executable code that, when executing on one or more processors, performs the steps of receiving, at a second server, a request for access from the first VPN client, the request including access credentials, sending, from the second server, the access credentials to the access server, receiving, from the access server at the second server, the first static IP address to be assigned again to the first VPN client, and assigning the first static IP address to the first VPN client.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for assigning a persistent internet protocol (IP) address to a virtual private network (VPN) client, the method comprising:
   receiving, at a first server, a request for access from a first VPN client, the request including access credentials and the first server having a routing table;
   sending, from the first server, the access credentials to an access server;
   determining, by the access server, whether a static IP address feature is enabled for the first VPN client with the access credentials;
   in response to determining that the static IP address feature is enabled for the first VPN client, receiving, from the access server at the first server, a first static IP address to be assigned to the first VPN client, wherein the first static IP address is selected from a plurality of available static IP addresses;
   assigning the first static IP address to the first VPN client;
   adding the first static IP address to a static routing path in the routing table, the static routing path specifying a tunnel (TUN) interface to which traffic associated with the first VPN client is to be routed, wherein the TUN interface is associated with the first server;
   receiving, at a second server different from the first server, a request for access from the first VPN client, the request including the access credentials;
   sending, from the second server, the access credentials to the access server;
   receiving, from the access server at the second server, the first static IP address to be assigned again to the first VPN client; and
   assigning the first static IP address from the second server to the first VPN client;
   wherein the static routing path is configured to be referenced to enable traffic associated with the first VPN client to be directed through the TUN interface.

2. The method of claim 1 further comprising assigning a first label to traffic associated with the first VPN client, wherein the first label indicates a rule to reference the static routing path.

3. The method of claim 1 further comprising:
   receiving, at the first server, a request for access from a second VPN client;
   determining whether the static IP address feature is enabled for the second VPN client; and
   assigning a dynamic IP address to the second VPN client upon determining the static IP address feature is not enabled for the second VPN client.

4. The method of claim 3 wherein the first server is assigned a plurality of dynamic IP addresses for assignment to VPN clients.

5. The method of claim 1 further comprising:
   receiving, at the first server, a second access request from the first VPN client; and assigning the static IP address to the first VPN client to satisfy the second request.

6. A system for assigning a persistent internet protocol (IP) address to a virtual private network (VPN) client, the system comprising:
   a first server including one or more processors executing instructions stored on memory and configured to:
      receive a request for access from a first VPN client, the request including access credentials and the first server having a routing table,
      send the access credentials to an access server,
      in response to determining by the access server that a static IP address feature is enabled for the first VPN client with the access credentials, receive from the access server a first static IP address to be assigned to the first VPN client, wherein the first static IP address is selected from a plurality of available static IP addresses,
      assign the first static IP address to the first VPN client,
      add the first static IP address to a static routing path in the routing table, the static routing path specifying a tunnel (TUN) interface to which traffic associated with the first VPN client is to be routed, wherein the TUN interface is associated with the first server, wherein the static routing path is configured to be referenced to enable traffic associated with the first VPN client to be directed through the TUN interface; and
   a second server, different from the first server, including one or more processors executing instructions stored on memory and configured to:

receive a request for access from the first VPN client, the request including the access credentials,
send the access credentials to the access server,
receive from the access server the first static IP address to be assigned again to the first VPN client, and
assign the first static IP address to the first VPN client.

7. The system of claim 6 wherein the first server is further configured to assign a first label to traffic associated with the first VPN client, wherein the first label indicates a rule to reference the static routing path.

8. The system of claim 6 wherein the first server is further configured to:
receive a request for access from a second VPN client,
determine whether the static IP address feature is enabled for the second VPN client, and
assign a dynamic IP address to the second VPN client upon determining the static IP address feature is not enabled for the second VPN client.

9. The system of claim 8 wherein the first server is assigned a plurality of dynamic IP addresses for assignment to VPN clients.

10. The system of claim 6 wherein the first server is further configured to:
receive a second access request from the first VPN client, and
assign the static IP address to the first VPN client to satisfy the second request.

11. A computer program product for assigning a persistent internet protocol (IP) address to a virtual private network (VPN) client, the computer program product comprising computer executable code embodied in one or more non-transitory computer readable media that, when executing on one or more processors, performs the steps of:
receiving, at a first server, a request for access from a first VPN client, the request including access credentials and the first server having a routing table;
sending, from the first server, the access credentials to an access server;
determining, by the access server, whether a static IP address feature is enabled for the first VPN client with the access credentials;
in response to determining that the static IP address feature is enabled for the first VPN client, receiving, from the access server at the first server, a first static IP address to be assigned to the first VPN client, wherein the first static IP address is selected from a plurality of available static IP addresses;
assigning the first static IP address to the first VPN client;
adding the first static IP address to a static routing path in the routing table, the static routing path specifying a tunnel (TUN) interface to which traffic associated with the first VPN client is to be routed, wherein the TUN interface is associated with the first server;
receiving, at a second server different from the first server, a request for access from the first VPN client, the request including the access credentials;
sending, from the second server, the access credentials to the access server;
receiving, from the access server at the second server, the first static IP address to be assigned again to the first VPN client; and
assigning the first static IP address from the second server to the first VPN client;
wherein the static routing path is configured to be referenced to enable traffic associated with the first VPN client to be directed through the TUN interface.

12. The computer program product of claim 11 further comprising computer executable code that, when executing on one or more processors, performs the step of assigning a first label to traffic associated with the first VPN client, wherein the first label indicates a rule to reference the static routing path.

13. The computer program product of claim 11 further comprising computer executable code that, when executing on one or more processors, performs the steps of:
receiving, at the first server, a request for access from a second VPN client;
determining whether the static IP address feature is enabled for the second VPN client; and
assigning a dynamic IP address to the second VPN client upon determining the static IP address feature is not enabled for the second VPN client.

14. The computer program product of claim 13 wherein the first server is assigned a plurality of dynamic IP addresses for assignment to VPN clients.

* * * * *